United States Patent
Saito (10) Patent No.: US 10,211,937 B2
(45) Date of Patent: Feb. 19, 2019

(54) SIGNAL CONTROLLING APPARATUS AND METHOD OF DEPLOYING PARAMETERS

(71) Applicant: YAMAHA CORPORATION, Hamamatsu-shi (JP)

(72) Inventor: Kosuke Saito, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 15/902,356

(22) Filed: Feb. 22, 2018

(65) Prior Publication Data

US 2018/0248635 A1 Aug. 30, 2018

(30) Foreign Application Priority Data

Feb. 28, 2017 (JP) ................................ 2017-037609

(51) Int. Cl.
*H04B 1/00* (2006.01)
*H04H 60/04* (2008.01)
(Continued)

(52) U.S. Cl.
CPC ......... *H04H 60/04* (2013.01); *G06F 3/04847* (2013.01); *G06F 3/04883* (2013.01); *G06F 3/165* (2013.01)

(58) Field of Classification Search
CPC . H04H 60/04; G06F 3/04847; G06F 3/04883; G06F 3/165
See application file for complete search history.

(56) References Cited

U.S. PATENT DOCUMENTS

2014/0286506 A1* 9/2014 Kamiya ................. H04H 60/04
381/119
2015/0212721 A1* 7/2015 Hayasaka ........... G06F 3/04847
715/833
(Continued)

FOREIGN PATENT DOCUMENTS

JP 2011066863 A 3/2011
JP 2016181834 A 10/2016

OTHER PUBLICATIONS

"Digital Mixing Console PM5D/PM5D-RH Owner's Manual" 2004: 1-409. Yamaha Corporation. English translation provided.
(Continued)

*Primary Examiner* — Simon King
(74) *Attorney, Agent, or Firm* — Rossi, Kimms & McDowell LLP (57) ABSTRACT

A group of one or more channels among a plurality of channels is allocated to one of channel strips. Signal-adjusting parameters of the one or more channels belonging to the group are controlled in an interlinked fashion in response to an operation of the one channel strip to which the group is allocated. In response to a deployment instruction, a deployment controlling circuitry presents values of the signal-adjusting parameters of the one or more channels belonging to the group in such a manner that the values of the signal-adjusting parameters of the one or more channels belonging to the group are presented by use of one of a display device and the channel strips, and that setting contents of manual-operators in the channel strips are presented by use of another of the display device and the channel strips.

10 Claims, 6 Drawing Sheets

(51) Int. Cl.
    *G06F 3/0484*     (2013.01)
    *G06F 3/0488*     (2013.01)
    *G06F 3/16*     (2006.01)

(56) References Cited

U.S. PATENT DOCUMENTS

| | | | |
|---|---|---|---|
| 2016/0274859 A1* | 9/2016 | Terada | G10H 1/0008 |
| 2016/0277134 A1* | 9/2016 | Terada | H04H 60/04 |
| 2016/0285573 A1* | 9/2016 | Terada | H04H 60/04 |
| 2016/0306536 A1* | 10/2016 | Suzuki | G06F 3/04842 |

OTHER PUBLICATIONS

"Digital Mixing Console M7CL Owner's Manual" 2005: 1-282. Yamaha Corporation. English translation provided.

\* cited by examiner

SIGNAL CONTROLLING APPARATUS AND METHOD OF DEPLOYING PARAMETERS

BACKGROUND

The present invention relates generally to a signal controlling apparatus constructed to allocate a channel group to one of a plurality of channel strips provided on an operation panel so that values of parameters for adjusting signals to be processed in a plurality of channels belonging to the channel group can be collectively adjusted by a manual-operator of the allocated channel strip, and more particularly to an improvement in techniques for visually deploying the individual values of adjusting parameters of individual channels belonging to the channel group.

Audio mixers (also referred to simply as "mixers") are constructed generally in such a manner that sound characteristics adjustment processing are performed on input audio signals in individual ones of a plurality of channels, the processed audio signals are selectively supplied to mixing buses, one or more audio signals supplied from one or more channels are mixed in at least one of the mixing buses, and one or more resultant mixed audio signals are output to one or more output destinations. A digital mixer performs various signal processing, such as sound characteristics processing, route setting of audio signals, etc., by performing digital signal processing on digital audio signals. All of parameter values for using in such signal processing are stored in a memory of the mixer. As well known in the art, the mixer includes, on an operation panel, a plurality of channel strips each having a plurality of manual-operators, such as a fader, an encoder and various buttons. A desired object of operation, such as one channel, is allocated to each of the channel strips, and a value of a desired parameter of the allocated object of operation is adjusted by use of any one of the manual-operators of the channel strip.

There has also been known a grouping function for grouping a plurality of channels into a channel group (hereinafter also referred to simply as "group") and collectively controlling individual channels belonging to the group. Such a grouping function is discloses, for example, in an instruction manual "YAMAHA DIGITAL MIXING CONSOLE PM5D/PM5DRH" published in 2004 by Yamaha Corporation and available from the Internet at URL:http://www2.yamaha.co.jp/manual/pdf/pa/japan/mixers/cs1d_ja_om_r21.pdf?_ga=1.18964906
7.145683692.1426226024 (hereinafter referred to as "Non-patent Literature 1") and an instruction manual "DIGITAL MIXING CONSOLE M7CL" published in 2005 by Yamaha Corporation and available from the Internet at URL: http://www2.yamaha.co.jp/manual/pdf/pa/japan/mixers/
m7c1_ja_om_e0.pdf?_ga=1.261478797.145
683692.1426226024 (hereinafter referred to as "Non-patent Literature 2"). For example, level adjustment and mote-ON/OFF can be performed collectively, by means of a single group fader operator, on individual channels belonging to one group (see "Chapter 7 DCA Group/Mute Group" at pages 92 to 98 of Non-patent Literature 1, and "Chapter 11 Grouping/Link" at pages 113 to 121 of Non-patent Literature 2). Further, pages 120 and 121 of Non-patent Literature 2 discloses a channel link function for causing a desired parameter to be interlinked among a plurality of channels belonging to a group.

Although the above-mentioned grouping function for grouping a plurality of channels into a group and collectively operating the channels belonging to the group by means of a single manual operator is convenient, a user may sometimes want to operate the channels of the group individually or independently of one another. Therefore, a digital mixer has been proposed and known which can deploy individual channels constituting (belonging to) a group to channel strips through a predetermined operation. Japanese Patent Application Laid-open Publication No. 2011-066863 (hereinafter referred to as "Patent Literature 1") discloses, as a technique for flexibly designating deployed-to (or deploying or deployment-destination) channel strips, dividing a plurality of channel strips on an operation panel into a plurality of blocks and designating any one of the blocks as a deployment destination so that individual channels constituting a group can be deployed to the channel strips belonging to the designated block.

Further, U.S. Patent Application Publication No. 2016/0285573 corresponding to Japanese Patent Application Laid-open Publication No. 2016-181834 (hereinafter referred to as "Patent Literature 2") discloses a mixer which is configured to: store, for each of channel strips, object-of-operation designation information that designates a channel or a group as an object of operation of the channel strip, or designates the channel strip as a deploying channel strip for individually deploying thereto any one of the channels belonging to the group; and allocate the object of operation to the plurality of channel strips based on the object-of-operation designation information, where none of the channels or group is allocated to the channel strip designated as the deploying channel strip so as to set the channel strip in an empty state as the deploying channel strip, and in response to a deployment instruction of a given group, individual channels belonging to the given group are allocated to the channel strips designated as the deploying channel strips.

However, with the conventionally-known technique as shown in the aforementioned Patent Literatures 1 and 2, because a predetermined block of channel strips or designated channel strips of the plurality of channel strips are dedicatedly set as deploying channel strips, it is necessary for the dedicated deploying channel strips to be put in the empty state at the time of non-deploying mode, and thus, the efficiency of utilization of the channel strips would be degraded. For this reason, the conventionally-known technique is not proper for applying to a small scale mixer having less channel strips. Although it would be possible for any one of channel strips in a mixer without any dedicated deploying channel strip to be used as a deploying channel strip in response to a deployment instruction, if so, such usage will bring an undesirable result that previous adjustment content having set, before the deployment instruction, in the channel strip used as the deploying channel strip has to be avoided by overwritten with contents of the deployment.

SUMMARY OF THE INVENTION

In view of the foregoing prior art problems, it is an object of the present invention to provide an improved signal controlling apparatus and method which, in deploying individual channels belonging to a given group to channel strips, can flexibly designate the channel strips that should be used as deployment destinations, and a method of deploying parameters in the signal controlling apparatus.

In order to accomplish the above-mentioned object, the present invention provides an improved signal controlling apparatus, which comprises: a plurality of channels that performs signal processing on input signals; a plurality of channel strips, each of the channel strips including a manual-operator for controlling a signal; a storage medium storing a program; and a processor for executing the program, the processor, when executing the program, configured to: allocate a group of one or more channels among the plurality of channels to one of the plurality of channel strips, so that respective signal-adjusting parameters of the one or more channels belonging to the group are controlled in an interlinked fashion in response to an operation of the manual-operator included in the one channel strip to which the group is allocated; and present, in response to a deployment instruction, values of the respective signal-adjusting parameters of the one or more channels belonging to the group in such a manner that the values of the respective signal-adjusting parameters of the one or more channels belonging to the group are presented by use of one of a display device and the plurality of channel strips, and that setting contents of the respective manual-operators in the plurality of channel strips are presented by use of another of the display device and the plurality of channel strips.

According to the present invention, in response to the deployment instruction, the values of the respective signal-adjusting parameters of the one or more channels belonging to the group are presented (namely, deployed) by use of one of the display device and the plurality of channel strips while the setting contents of the respective manual-operators in the plurality of channel strips are presented by use of another of the display device and the plurality of channel strips, and thus, because no dedicated deploying channel is needed, all channel strips can be used efficiently without waste channel strip being in an empty state. Further, because the setting contents having been set or adjusted, before the deployment instruction, in the respective channel strips are maintained as they are or displayed on the display device after the deployment instruction, it is never caused such inconvenience that previous adjustment contents having set, before the deployment instruction, in the channel strips are avoided by overwritten with contents of the deployment.

The present invention may be constructed and implemented not only as the apparatus invention discussed above but also as a computer-implemented method invention. Also, the present invention may be implemented as a non-transitory computer-readable storage medium storing a program executable by one or more processors for performing the method.

The following will describe embodiments of the present invention, but it should be appreciated that the present invention is not limited to the described embodiments and various modifications of the invention are possible without departing from the basic principles of the invention. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION

Now, with reference to the accompanying drawings, a description will be given about an embodiment of the present invention in detail.

Figure 1:
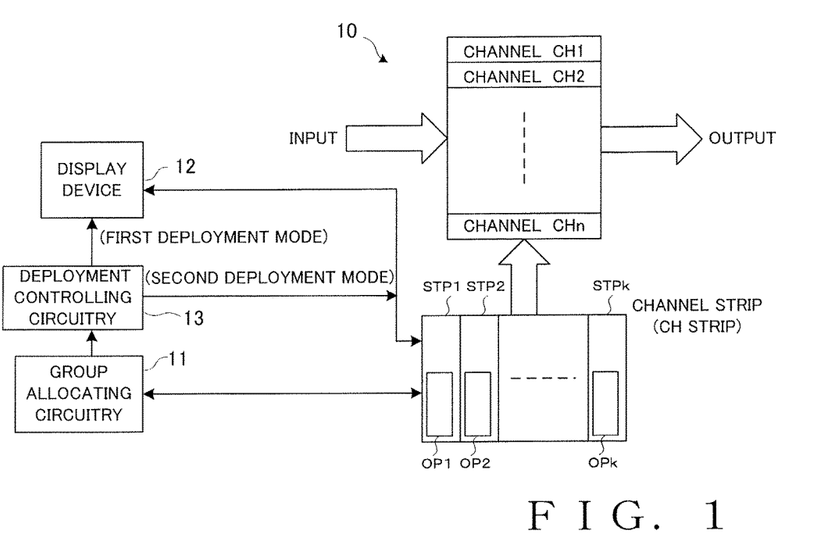
FIG. 1 is a conceptual diagram explanatory of an example structure of a signal controlling apparatus of the present invention.

FIG. 1 is a conceptual diagram explanatory of an example structure of a signal controlling apparatus of the present invention. Signal controlling apparatus 10 shown in FIG. 1 at least comprises a plurality of channels CH1 to CHn for performing signal processing on input signals; and a plurality of channel strips STP1 to STPk. Each of the channel strips STP1 to STPk includes at least one manual-operator OP1-OPk for controlling an audio signal. Each manual-operator OP1-OPk is a physical operator, that is manually operable by a user and/or automatically controllable by electrics, such as a fader, a rotary knob, a switch or the like for controlling tone volume, etc. as well-known in conventional audio mixers. Although the number (n) of the audio signal processing channels CH1 to CHn having the signal controlling apparatus 10 is quite large, in contrast, the number (k) of the channel strips STP1 to STPk is small; while the number "n" is more than a hundred, for example, the number "k" is generally more than ten and less than twenty. For this reason, any of the channels in the signal controlling apparatus 10 can be allocated to any of the channel strips STP1 to STPk, and each of the channel strips STP1 to STPk is constructed to be able to set or adjust a tone volume parameter or the like, for processing a signal to be processed in the channel allocated to the channel strip, in response to an operation of one of manual-operators OP1 to OPk provided in the channel strips STP1 to STPk. It is very conventional to thus allocate any one channel to any channel strip among the limited number of channel strips STP1 to STPk and perform a setting/adjusting operation for signal processing in the channel by use of the manual-operator of the allocated channel strip (such an operation should be referred to as "individual channel allocation" function hereinafter), so a detailed description about such an operation will be omitted in the present specification.

On the other hand, it is also known as a kind of channel allocation function that there is a "group allocation" function for allocating a plurality of channels to a channel strip. The signal controlling apparatus 10 further comprises a group allocating circuitry 11 for such a "group allocation" function. The group allocating circuitry 11 operates in such a manner as to allocate one group consisting of one or more channels among the plurality of channels to one channel strip among the plurality of channel strips STP1 to STPk and control, in an interlinked fashion, audio-signal-adjusting parameters of the one or more channels belonging to the one group in response to an operation of the manual-operator in the one channel strip to which the one group is allocated.

Further, according to the present invention, in association with such a "group allocation" function, a display device 12 is provided, and a deployment controlling circuitry 13 is also provided in order to present values of respective signal adjusting parameters of the one or more channels belonging to the one group in response to a deployment instruction. The deployment controlling circuitry 13 presents, by use of one of the display device 12 and the plurality of channel strips STP1 to STPk, the values of the respective signal adjusting parameters of the one or more channels belonging to the group, and the deployment controlling circuitry 13 also presents, by use of another of the display device 12 and the plurality of channel strips STP1 to STPk, current setting contents of the manual-operators OP1 to OPk of the plurality of channel strips STP1 to STPk. With this arrangement, in response to the deployment instruction that designates/selects a particular group, the values of the respective signal adjusting parameters of the one or more channels belonging to the particular group are displayed on the display device or set to one or more channel strips of the plurality of the channel strips, so that the respective signal adjusting parameters are presented in a condition deployed for individual channels through the display device or the one or more channel strips. A user can recognize a setting condition of the respective signal adjusting parameters of the individual channels belonging to the group by viewing the presentation of the parameters. Thus, because no dedicated deploying channel is needed, all channel strips can be used efficiently without waste channel strip being in an empty state. Further, because the setting contents having been set or adjusted, before the deployment instruction, in the respective channel strips STP1 to STPk are maintained as they are or displayed on the display device 12 after the deployment instruction, it is never caused such inconvenience that the setting contents having been set or adjusted, before the deployment instruction, in the respective channel strips are avoided by over-written with contents of the deployment.

A mode referred to as a first deployment mode for the sake of convenience hereinafter is a mode in which, in response to the deployment instruction, the values of the respective signal adjusting parameters of the one or more channels belonging to the one group are displayed on the display device 12 while the current setting contents of the manual-operators OP1 to OPk of the plurality of channel strips STP1 to STPk are maintained as they are. Also, another mode referred to as a second deployment mode for the sake of convenience hereinafter is a mode in which, in response to the deployment instruction, the values of the respective signal adjusting parameters of the one or more channels belonging to the one group are set to the one or more channel strips of the plurality of the channel strips STP1 to STPk while the current setting contents of the manual-operators OP1 to OPk of at least the one or more channel strips among the plurality of channel strips STP1 to STPk are displayed on the display device 12. However, it should be noted that the signal controlling apparatus 10 according to the present invention is not necessarily capable of realizing both of the first and second modes and may be capable of realizing only one of the first and second modes. In the embodiments described hereinafter, a construction capable of realizing only the first mode will be described mainly, and thereafter, as a modification of the construction, a construction capable of selectively realizing the second mode will be described. Note that the construction capable of selectively realizing the second mode will be described as an automatic "flip" process.

The signal controlling apparatus 10 of FIG. 1 is applicable to an audio equipment processing on audio signals, such as an audio mixer, for example. The embodiment to be described hereinafter is an example of the audio mixer (also simply referred to as "mixer") to which the signal controlling apparatus 10 is applied. This audio mixer 20 is assumed as a digital mixer processing on audio signals by digital signal processing entirely.

Figure 2:
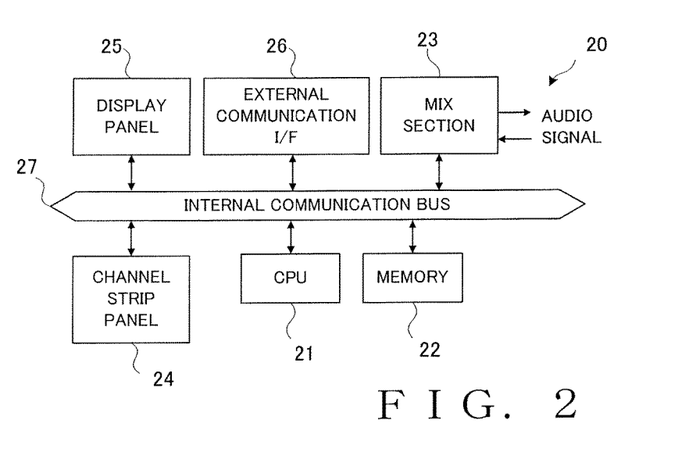
FIG. 2 is a block diagram showing an example electric hardware setup of an audio mixer to which is applied the embodiment of the signal controlling apparatus of FIG. 1.

FIG. 2 is a block diagram showing an example electric hardware setup of the mixer 20. In FIG. 2, the mixer 20 includes a central processing unit (CPU) 21, a memory 22, a mixing circuitry 23 ("MIX circuitry" in the figure), a channel strip panel 24, a display panel 25, an external communication interface (I/F) 26, etc. These components 21 to 26 are interconnected via an internal communication bus 27, so that various signals can be communicated between the CPU 21 and the components 22 to 26.

The CPU (i.e., a processor) 21 controls overall operation or behavior of the mixer 20 by executing various programs stored in the memory (i.e., a storage medium) 22. The memory 22 not only non-volatilely stores various programs to be executed by the CPU 21 and various data to be referenced by the CPU 21, but also is used as a loading area for a program to be executed by the CPU 21 and as a working area for use by the CPU 21. The memory 22 may comprise a combination of various memory devices, such as a read-only memory (ROM), a random-access memory (RAM), a flash memory and a hard disk. Further, the memory 22 stores the values of all parameters to be used for signal processing in the mixing circuitry 23.

The mixing circuitry 23 is constructed by a signal processing device such as a DSP (Digital Signal Processor), for example, or a device virtually implemented by the CPU 21 and software stored in the memory 22. The mixing circuitry 23 executes a signal processing program to perform signal processing on one or more audio signals supplied from not-shown input equipment and outputs the thus-processed audio signals to not-shown output equipment.

Figure 3:
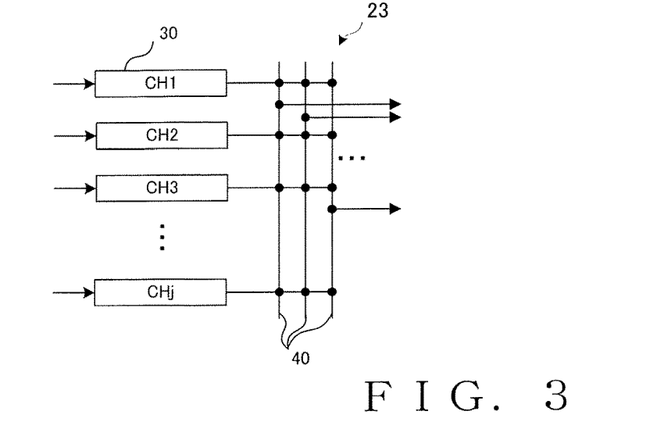
FIG. 3 is a block diagram showing an example construction for implementing a signal processing function of a mixing circuitry shown in FIG. 2.

FIG. 3 is a block diagram explanatory of a construction for implementing the signal processing in the mixing circuitry 23. In an embodiment, the mixing circuitry 23 includes an input channel block 30 consisting of a plurality of input channels CH1-CHj, and also includes a plurality of mixing buses 40. Each of the input channels CH1-CHj performs various signal processing on an input audio signal and supplies the thus-processed audio signal to any one or more of the mixing buses 40 selected by a user. Each of the mixing buses 40 mixes the audio signals supplied from one or more input channels CH1-CHj, and outputs the thus-mixed audio signal through an output channel (not shown) corresponding to the mixing bus 40. Although the mixing circuitry 23 may include various types of channels, among the channels CH1-CHn, other than the aforementioned input channels CH1-CHj and output channels, a detailed description of such other types of channels is omitted. The signal processing performed by the channels CH1-CHn in the mixing circuitry 23 is controlled based on current values of various parameters having been stored in corresponding relation to the individual channels CH1-CHn in a current buffer of the memory 22. Content of the current buffer for the individual channels CH1-CHn are renewed in response to a user's operation of the channel strip panel 24 and can be renewed in response to a user's operation of the display panel 25 as necessary.

Reverting to FIG. 2, an operation panel of the mixer 20 comprises the channel strip panel 24 and the display panel 25. The channel strip panel 24 comprises the aforementioned plurality of channel strips STP1 to STPk, other manual-operators and an interface circuit associated with these channel strips and operators. The display panel 25 corresponds to the aforementioned display device 12 and comprises a display panel capable of touch input operation and an interface circuit associated therewith. Specifically, the display panel 25 capable of touch input operation includes a display mechanism comprising a liquid crystal display, an organic EL display or the like and a detection mechanism configured to detect a touch with a finger or the like of a user (human operator) on a display screen. The detection mechanism detects a position of the touch and outputs a detection signal indicative of the detected position to the CPU 21. For example, the detection mechanism may be constructed to separately detect and recognize two or more touch positions (namely, multi-touch) on the display screen. In this specification, an input operation by user's touch on the touch-type display panel 25 is referred to as "touch".

Figure 4:
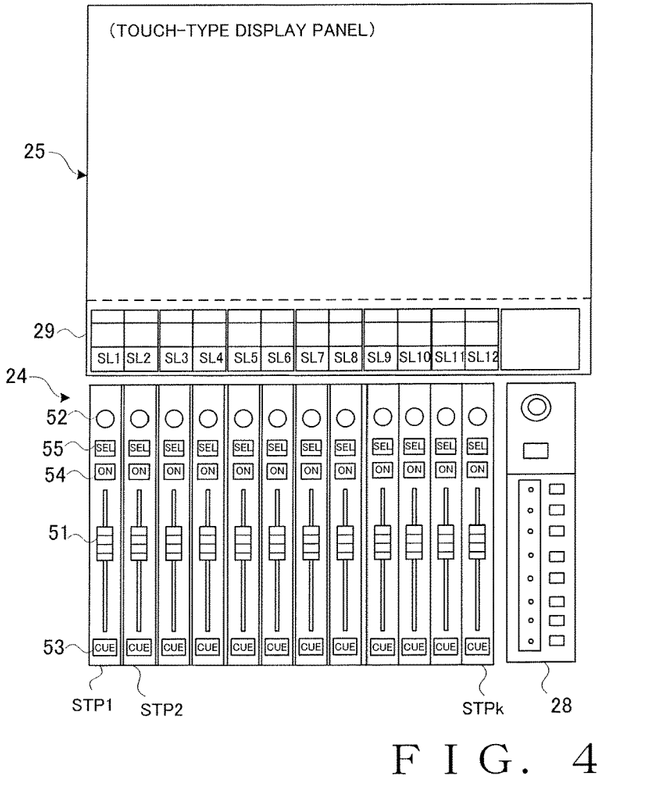
FIG. 4 is a block diagram showing an example construction of an operation panel of the audio mixer of FIG. 2.

FIG. 4 shows an example construction of the operation panel of the mixer 20. As only an example, the channel strip panel 24 is disposed in a lower region of the operation panel and the display panel 25 is disposed in an upper region of the operation panel. The plurality of channel strips STP1 to STPk are provided in the channel strip panel 24 with each strip aligned in parallel in a lateral direction, and other manual-operators 28 are provided in the channel strip panel 24 as well. Note that, in this specification, a vertical direction denotes a front-back direction which extends from a front side (namely, user's location) of the display panel to a back side thereof; in other words, the vertical direction corresponds to a direction extending from a lower side to an upper side in FIG. 4.

A single channel strip STP1 includes: the tone volume adjusting fader operator 51; a multi-use rotary knob type operator 52 to which a desired parameter can be allocated; a CUE key 53 for switching between ON and OFF of a cueing function; an ON/OFF key 54 for controlling ON and OFF of the corresponding channel; and a selection (SEL) key 55 for selecting the corresponding channel, for example. Other channel strips STP2 to STPk includes the same construction components as the channel strip STP1. In the aforementioned "individual channel allocation" function, for each of the channel strips STP1 to STPk, a single channel is allocated to the channel strip as an operation-object of the channel strip. On the other hand, in the aforementioned "group allocation" function, one group of a plurality of channels is allocated to one of the channel strips STP1 to STPk. Thus, the user (human operator) can adjust values of various parameters, such as the tone volume, of the allocated channel or group by use of various manual-operators provided in the respective channel strips STP1 to STPk.

Various graphic images responsive to various stages of processing are displayed on the display panel 25 under the control of CPU 21, and image objects as an object of a user's operation are appropriately displayed as well. The user can also adjust values of various parameters, such as the tone volume, of the allocated channel or group by performing a touch operation on an image object displayed on the display panel 25.

A strip selector 29 comprises a plurality of strip selection switches SL1 to SLk, for selecting any of the plurality of channel strips STP1 to STPk, which are aligned in the lateral direction in corresponding relation to the placement of the respective channel strips STP1 to STPk aligned in the lateral direction. As shown in FIG. 4, the individual strip selection switches SL1 to SLk are arranged in such a manner as to locate over the individual channel strips STP1 to STPk so that each one of the strip selection switches located over each particular one of channel strips corresponds to the particular channel strip. When individual groups are allocated to individual channel strips STP1 to STPk according to the "group allocation" function, each one of the strip selection switches SL1 to SLk functions as a deployment instructing member that selects a group allocated to the corresponding strip selection switch and instructs to deploy member channels belonging to selected group. On the other hand, when individual channels are allocated to individual channel strips STP1 to STPk according to the "individual channel allocation" function, each one of the strip selection switches SL1 to SLk performs a function other than the function of the deployment instructing member, so that the strip selection switches are used for multi-purposes.

In an embodiment, the channel strips STP1 to STPk of the channel strip panel 24 are managed based on a layer concept in which, upon selection of one of a plurality of layers, a combination of channels and/or groups is defined according to the selected layer and the defined channels and/or groups are allocated to a set of channel strips STP1 to STPk. For example, in a case where a DCA group layer is selected, individual 12 (twelve) DCA groups #1 to #12 are allocated to individual strips among the set of channel strips STP1 to STPk. In such a case, individual strip selection switches SL1 to SLk of the strip selector 29 function as the deployment instructing members for selecting the individual DCA groups #1 to #12 allocated to the individual channel strips STP1 to STPk corresponding to the individual strip selection switches, and for instructing the deployment of the selected DCA group. Note that DCA stands for "Digital-Controlled Amplifier" which is a kind of an amplifier capable of controlling a tone volume level of an audio signal in the corresponding channel in a digital manner, and that a parameter value for adjusting the tone volume level can be variably adjusted in response to an operation of the fader operator 51 and/or other operator or switch. In an embodiment described hereinafter, the description will be made about the DCA groups as an example of grouping to which the present invention is applied. However, the present invention is applicable to any other type of grouping rather than the DCA groups.

In FIG. 4, the strip selector 29 is displayed in a predetermined lower region on the display panel 25 in a form of virtual selection switches. In a case of such virtual selection switches, the strip selector 29 is not necessarily always displayed in the predetermined lower region on the display panel 25, but the strip selector 29 may be displayed (or appear) only when it is necessary. Alternatively, the strip selector 29 may comprise physical selection switches separate from the display panel 25 rather than the virtual selection switches displayed in the predetermined lower region on the display panel 25. In a case of the physical selection switches, the strip selector 29 may be disposed on an upper side of the channel strips STP1 to STPk or conversely disposed on a lower side of the channel strips STP1 to STPk. Further, a member or means for selecting a group and instructing to deploy a channel construction of the selected group is not limited to a physical and/or virtual selector or switch operable by a user, but it may be in a form of an electronic data included in music sequence performance information, a set of scene data, or the like.

Figure 5:
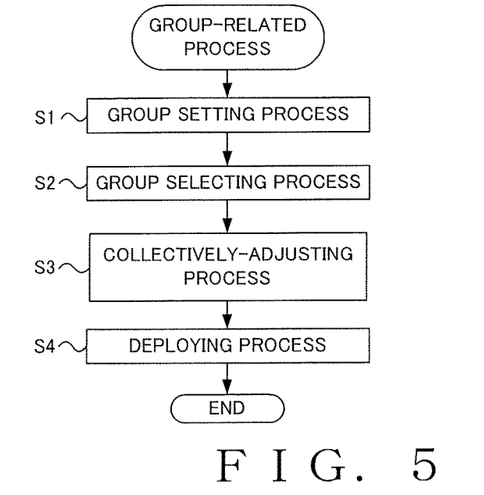
FIG. 5 is a schematic flow chart showing an example of a group-related process executed by a CPU shown in FIG. 2.

FIG. 5 is a schematic flow chart showing a process related to the group allocation function (namely, a group-related process) executed by the CPU 21. The CPU 21 executes a "group setting process" at step S1, a "group selecting process" at step S2, and a "collectively-adjusting process" at step S3. Processing performed at these steps S1-S3 corresponds to the processing performed by the group allocating circuitry 11 of FIG. 1. The "group setting process" at step S1 performs to set, for each of a plurality of groups, member construction of the group according to a user's preference (namely, set desired channels so as to belong to the group) and store data indicative of the set member construction of each group in a grouping table in the memory 22. The user can use the channel strip panel 24 and the display panel 25 to conduct the "group setting process". It should be noted that the "group setting process" at step S1 can be omitted, and that default values indicative of preset member construction of respective groups may be stored in the grouping table instead.

In the "group selecting process" at step S2, the CPU 21 determines whether the DCA group layer is selected by the user, and if the DCA group layer is selected, the CPU 21 allocates the respective groups #1 to #12 to the respective channel strips STP1 to STPk of the channel strip panel 24 as collectively-adjusting channel strips for the respective groups #1 to #12. Specific channels belonging to the respective groups are identified by the data indicative of the member construction stored in the grouping table. Thus, processing for allocating one group consisting of one or more channels among the plurality of channels CH1 to CHn to one channel strip among the plurality of channel strips STP1 to STPk is carried out by a combination of the grouping table (or step S1) and the "group selecting process" at step S2. It should be noted that the "group selecting process" at step S2 is not limited to determine that the DCA group layer is selected by the user's selection operation of the DCA group layer, and may be configured to determine that the DCA group layer is selected on the basis of DCA group layer selection data included in scene recall information or group layer selection data supplied from an outside via the external communication interface 26.

In the "collectively-adjusting process" at step S3, the CPU 21 detects an operation of the fader operator 51 and/or other manual-operators or switches in the respective channel strips STP1 to STPk, as the collectively-adjusting channel strips, to which the respective DCA groups are allocated, and in response to the operation of the fader operator 51 and/or other manual-operators or switches, the CPU 21 controls respective audio-signal-adjusting parameters of one or more channels belonging to the group in an interlinked fashion. Specifically, as for the respective one or more channels belonging to the group, respective values of a predetermined type of parameters for the respective one or more channels stored in the current buffer of the memory 22 (e.g., in a case of the DCA group, tone volume parameter values) are collectively adjusted in response to an operation of a predetermined manual-operator included in the channel strip related to the group (e.g., in a case of the DCA group, the fader operator 51). For example, in a case where the DCA group allocation is made such that four channels CH1, CH2, CH3, CH4 belong to the group #1, when the user operates the predetermined manual-operator (e.g, the fader operator 51 in a case of the DCA group) included in the channel strip STP1 related to the group #1, the step S3 is executed by the CPU 21 so that respective values of the predetermined type of parameters for the respective channels CH1, CH2, CH3, CH4 belonging to the group #1 (i.e., in a case of the DCA group, tone volume parameter values controlled by the fader operator 51) are controlled in an interlinked fashion.

More specifically, respective values (i.e., original values) of the predetermined type of parameters for the respective channels stored in the current buffer are maintained without renewing, while, in response to an amount of the operation of the predetermined manual-operator included in the channel strip related to the group, respective arithmetic calculations (e.g., linear multiplication or decibel addition using the amount of the operation as a coefficient) for modifying the respective parameter values for the respective channels are carried out in the respective channels, results of the respective arithmetic calculations (namely, modified values) are output as control parameters (e.g., tone volume parameters) of audio signals for the respective channels, and the audio signals for the respective channels are controlled by the output control parameters (namely, modified values) respectively. It should be noted that the current buffer also stores therein information indicative of respective current amounts of operations of the predetermined manual-operators included in the respective channel strips related to the respective groups, and that the respective arithmetic calculations for the collectively-adjusting process can be performed by use of the stored information indicative of respective current amounts of operations and the stored values of the predetermined type of parameters (i.e., original values) without renewing the original values. Therefore, when the group control is cancelled thereafter, an influence effected on the modified values of the parameters of the respective channels with the operation of the predetermined manual-operator included in the channel strip related to the group, to which the respective channels belong, can be immediately eliminated by outputting, as the control parameters (e.g., tone volume parameters) of audio signals for the respective channels, the stored values of the predetermined type of parameters (i.e., original values) from the current buffer.

At step S4 of FIG. 5, the CPU 21 executes a "deploying process". The "deploying process" at step S4 corresponds to the processing performed by the deployment controlling circuitry 13 of FIG. 1, and the "deploying process" is assumed to perform processing in the first deployment mode, for example. Namely, in a case of the first deployment mode, at step S4, the CPU 21 detects a deployment instruction issued by the user, and causes the display panel 25 to, in response to the deployment instruction, display the values of the respective audio-signal-adjusting parameters of the one or more channels (i.e., members) belonging to the group on the display screen.

Figure 6:
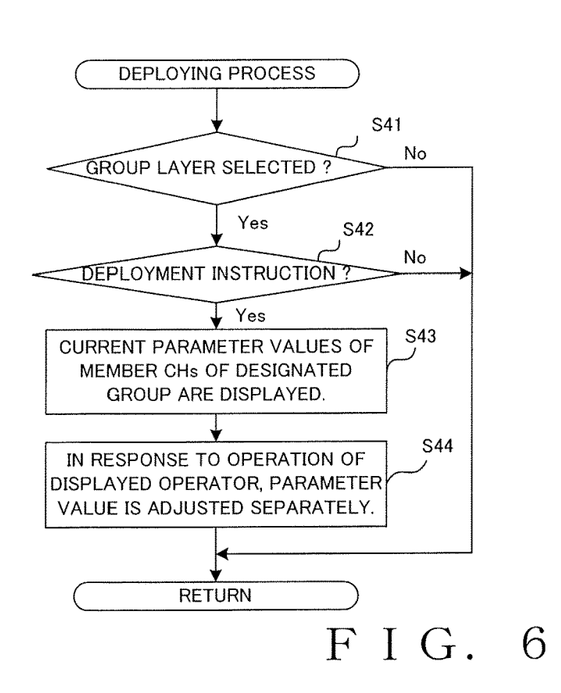
FIG. 6 is a schematic flow chart showing an example of a deploying process executed by the CPU shown in FIG. 2.

FIG. 6 is a flow chart showing a specific detailed example of the "deploying process" performed at step S4. At step S41, the CPU 21 determines whether or not the DCA layer is selected as a layer functioning currently in the channel strip panel 24. If a "YES" determination is made at step S41, at next step S42, the CPU 21 determines whether or not any of the strip selection switches SL1 to SLk of the strip selector 29 is operated by a user, namely a deployment instruction selecting (or designating) a particular DCA group (i.e., channel strip) is issued by the user. If a "YES" determination is made at step S42, at next step S43, the CPU 21 causes the display panel 25 to display the values of the predetermined type of the respective audio-signal-adjusting parameters of the one or more channels (i.e., members) belonging to the particular DCA group on the display screen (the first deployment mode). This process of displaying can perform by referencing the grouping table and the current buffer. Note that the values of the respective audio-signal-adjusting parameters to be used in the "deploying process" are assumed to be the modified values. However, the CPU 21 may cause the display panel 25 to display not only the modified values but also the original values thereof. Alternatively, the CPU 21 may cause the display panel 25 to display the original values and the amount of the operation for collectively adjusting in parallel on the display screen without displaying the modified values. It should be noted that, during the processing at step S43, the current setting contents of the respective channel strips STP1 to STPk of the strip panel 24 are maintained as they are, without being overwritten with contents of the deployment.

Figure 7:
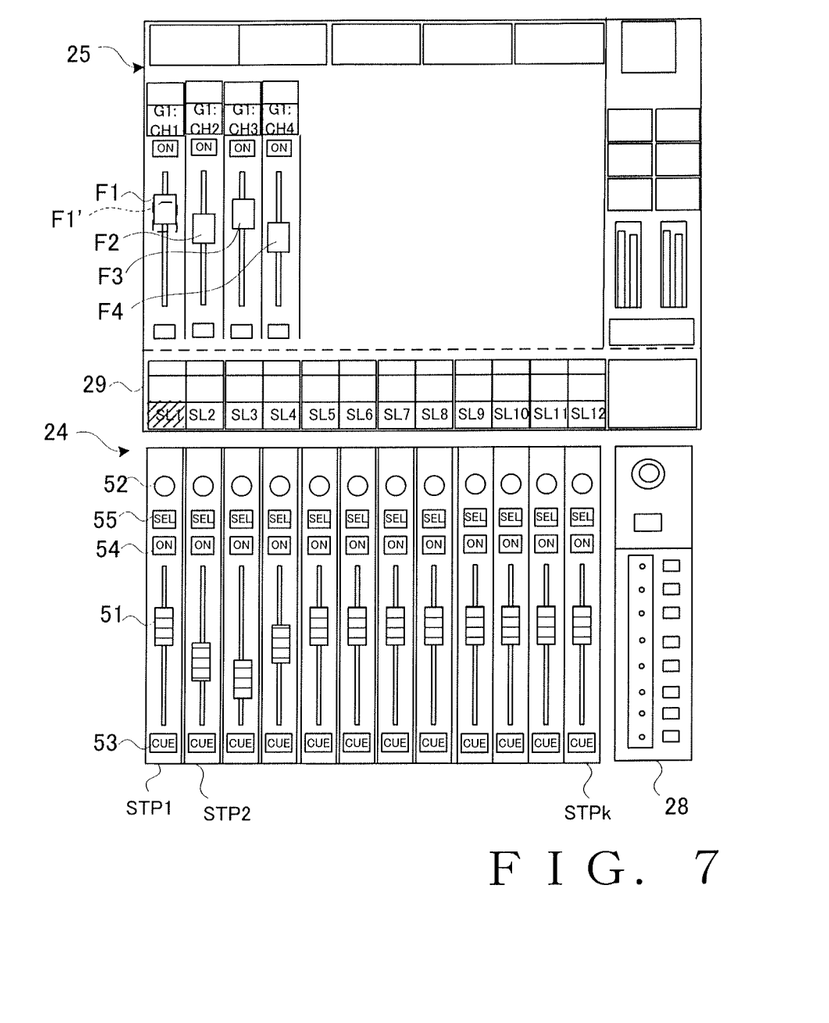
FIG. 7 is a diagram showing an example image displayed on a display panel screen responsive to a deployment instruction.

FIG. 7 is a diagram showing an example image displayed on the display screen of the display panel 25 on the basis of the processing at step S43. In this example image, it is assumed that the deployment of the DCA group #1 is instructed by operating the strip selection switch SL1 of the strip selector 29, and that members of the DCA group #1 are four channels CH1, CH2, CH3, CH4 (namely, member channels). For example, an indicator of the switch SL1 of the strip selector 29 changes its display state to show that the switch SL1 has been turned on. Further, strip images of the four member channels CH1, CH2, CH3, CH4 belonging to the DCA group #1 are displayed in parallel on the display panel 25, virtual images F1 to F4 of the fader operator 51 are displayed in the respective strip images, and respective knobs of the virtual images F1 to F4 of the fader operator are depicted such that the respective knobs come to respective positions corresponding to current parameter values after the collective adjustment (namely, the modified values). Also, a character image "G1" indicative of a name of the DCA group #1 and character images "CH1", "CH2", "CH3", "CH4" indicative of names of the respective member channels are displayed in the respective strip images so as to notify the user which channels are associated with the parameter values indicated by the virtual images F1 to F4 of the fader operator. For example, an inside area of each of frames in which the character image "G1" of the group name and the character images "CH1", "CH2", "CH3", "CH4" of the channel names are displayed may be painted with a color peculiar to the DCA group #1. Note that the original values of the respective member channels may be additionally displayed along with the aforementioned images as depicted with a reference character F1' in FIG. 7 as an example.

Figure 8:
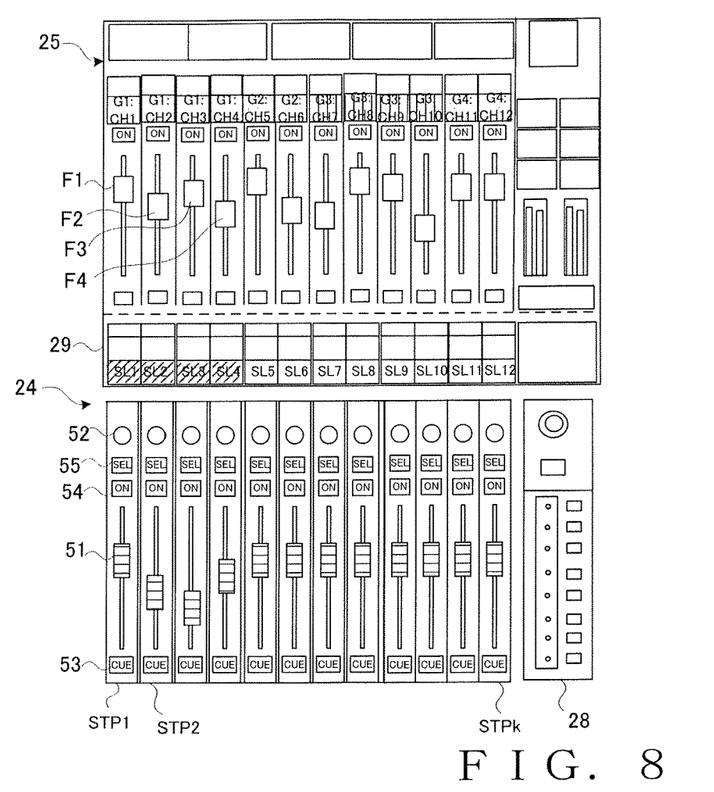
FIG. 8 is a diagram showing another example image displayed on the display panel screen responsive to the deployment instruction.

FIG. 8 is a diagram showing another example image displayed on the display screen of the display panel 25 on the basis of the processing at step S43. In this example image, it is assumed that the deployment of a plurality of DCA groups #1, #2, #3, #4 is instructed by operating the strip selection switches SL1, SL2, SL3, SL4 of the strip selector 29, and that members of the DCA group #1 are four channels CHL CH2, CH3, CH4, the DCA group #2 two channels CH5, CH6, the DCA group #3 four channels CH7, CH8, CH9, CH10 and the DCA group #4 two channels CH11, CH12. In FIG. 8 as well as FIG. 7, virtual images of the fader operator are displayed within the respective strip images corresponding to members of the respective DCA groups of which the deployment is instructed in such a manner that virtual images of the fader operator indicate the respective current parameter values, and names of the respective DCA groups and names of respective member channels are displayed. Also, respective inside areas of respective frames in which the respective group names and the channel names are displayed may be painted with different colors peculiar to the respective DCA groups, so that the respective DCA groups can be discriminated at a glance.

In a case where the number of channels to be displayed on the display panel 25 for the deployment increases (e.g., more than thirteen), the respective strip images may be displayed in a suitably reduced scale, or a design for an arrangement of the strip images on the display screen may be suitably changed. For example, in a case where thirteen through twenty-four channels should be simultaneously displayed on the display panel 25 for the deployment, a vertical size of the respective strip images as shown in FIG. 7 or 8 may be reduced to half and two rows of twenty strip images may be displayed up and down on the display screen, so that twenty-four strip images in total can be simultaneously displayed on the display screen. Although the current parameter values of the respective channels are indicated by displacement of respective knob's positions in FIGS. 7 and 8, a presentation style of the current parameter values is not limited to such a style as shown in FIGS. 7 and 8. For example, the current parameter values of the respective channels may be indicated by displacement of suitable indicator images, digital numerical values, or any other suitable indication style.

With such an arrangement that the current parameter values of the member channels of the DCA group are displayed on the display screen for the deployment on the basis of the aforementioned processing of step S43, the user can quickly recognize, by viewing the displayed parameters, the current parameter values set in the respective channels belonging to the DCA group. In the embodiment, the CPU 21 may be further configured to be able to adjust or control the parameter values of the member channels of the DCA group displayed on the display screen for the deployment by means of a user's touch operation of a virtual manual-operator (i.e., virtual image of the fader operator) displayed on the display panel 25. For this purpose, the embodiment as shown in FIG. 6 is configured to execute step S44 after step S43. At step S44, the CPU determines whether or not a user's touch operation is performed on any of the virtual manual-operators (i.e., virtual images of the fader operator) in the strip images for the respective channels displayed on the display panel 25, and, if the user's touch operation is performed, then the CPU 21 adjusts or controls a parameter value of a channel corresponding to the touch-operated virtual manual-operator in response to an amount of the touch operation, separately from other channels. In response to the touch operation, an operation position of the virtual manual-operator (i.e., virtual image of the fader operator) displayed on display screen of the display panel 25 can be displaced, and the current parameter value of the corresponding channel stored in the current buffer is renewed/rewritten. Namely, the respective strip images of the member channels of the group displayed (or deployed) on the display panel 25 in response to the deployment instruction function not only as a display member for displaying the parameter value but also as a parameter-variably-adjusting member for actually adjusting the parameter value, i.e., a virtual manual-operator. In other words, the virtual manual-operator functions so as to adjust, separately from each other, the values of the respective audio-signal-adjusting parameters displayed on the display panel 25 in response to a user's operation.

Note that the step S44 can be omitted from the deploying process. Namely, in the deploying process, the display panel 25 may carry out only the function for displaying at step S43 but not the function as the parameter-variably-adjusting member (i.e., virtual manual-operator) at step S44. In a further modified embodiment, the step S44 is not omitted, but the function as the parameter-variably-adjusting member (i.e., virtual manual-operator) at the step S44 may be carried out by a suitable physical manual-operator not a touch operation on the display panel 25. Namely, the CPU 21 may be configured such that the parameter value of any channel among the member channels deployed and displayed on the display panel 25 is changed (i.e, an operation position of the displayed image of the fader operator is varied) in response to an operation of the physical manual-operator. The multi-use rotary knob type operator 52 disposed at the top portion of each of the channel strips of the channel strip panel 24 may be used as such a physical manual-operator. In other words, the multi-use rotary knob type operator 52 may be configured to carry out a function, among multi-function allotted to the operator 52, as an operator for variably adjusting a parameter value of the corresponding channel displayed on the display screen for the deployment.

When the current parameter values of the member channels of the DCA group responsive to the deployment instruction are displayed on the display panel 25 for the deployment (at step S43) and the displayed virtual manual-operators are put in a condition capable of receiving a user's operation (at step S44) as aforementioned, the DCA group layer selected in the channel strip panel 24 is maintained as it is. Therefore, it is never caused such inconvenience that the setting contents of the channel strip panel 24 having been used immediately before the deployment instruction are avoided by overwritten with contents of the deployment, so the setting contents of the channel strip panel 24 for the selected DCA group layer are maintained as they are. In this way, during the time when the current parameter values of the member channels of a particular DCA group responsive to the deployment instruction are displayed on the display panel 25 for the deployment, once any manual-operator in a particular channel strip to which the particular DCA group is allocated is operated, the "collectively-adjusting process" at step S3 shown in FIG. 5 is performed so that, in response to the operation of the manual-operator, parameter values of all member channels of the particular DCA group displayed currently on the display panel 25 for the deployment are collectively adjusted, respective operation positions of respective virtual manual-operators (i.e., virtual images of the fader operator) for the respective channels belonging the particular DCA group displayed currently on the display panel 25 are varied as well, and current parameter values of the respective channels belonging to the particular DCA group are renewed in the current buffer. Thus, the user can collectively adjust the parameter values of the respective channels belonging to the particular DCA group as visually recognizing the current parameter values of the respective channels belonging to the particular DCA on the display panel 25 for the deployment.

Figure 9:
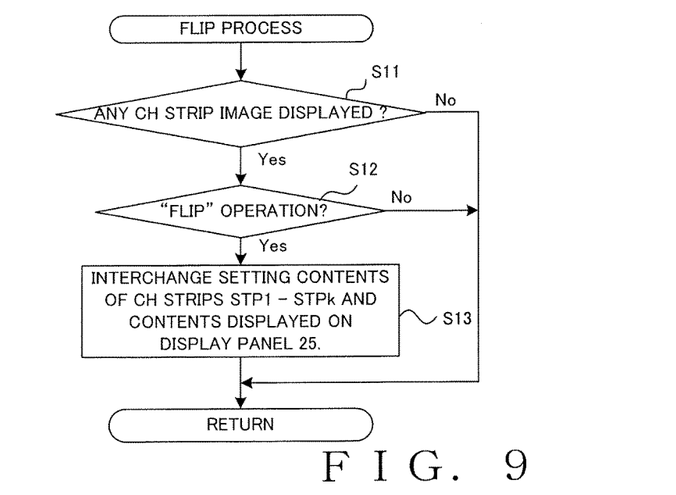
FIG. 9 is a schematic flow chart showing an example of a flip process executed by the CPU shown in FIG. 2.

Next, a description will be given about a "flip" process for causing corresponding channel strips of the channel strip panel 24 to reflect the current parameter values of the respective member channels of the particular DCA group displayed on the display panel 25 for the deployment. A physical or virtual "flip" switch (not shown) is provided on the channel strip panel 24 and/or the display panel 25. FIG. 9 is a schematic flow chart showing an example of the flip process performed in response to an operation of the "flip" switch. At step S11, the CPU 21 determines whether or not any channel strip image is displayed on the display screen of the display panel. If a "Yes" determination is made at step S11, then the CPU 21 proceeds to step S12, where it determines whether the "flip" switch is operated or not. If the "flip" switch is operated, the CPU 21 proceeds to step S13, where it performs processing to interchange the setting contents of the channel strips STP1 to STPk and the parameter contents displayed on the display panel 25. Namely, not only the setting contents of the DCA layer having appeared in the channel strips STP1 to STPk are displayed on the display screen of the display panel 25 as they are, but also the current parameter values (i.e., the modified values) of the member channels of the DCA group having been displayed on the display screen of the display panel 25 for the deployment are set to the corresponding channel strips STP1 to STPk of the channel strip panel 24, simultaneously. Namely, the deployed individual channels of one or more DCA groups are allocated to the channel strips STP1 to STPk as a single layer. In this case, the physical manual-operators such as the fader operator 51 and switches in the channel strips STP1 to STPk are electrically controlled to automatically move so as to present respective operation positions, corresponding to the deployed current parameter values (namely, modified values), in the respective physical manual-operators. In a case where a so-called "flip" operation is performed in the aforementioned manner, the current parameter values of the member channels of the DCA group displayed once on the display screen for the deployment can be modified or adjusted separately by an operation of any of the channel strips STP1 to STPk. In this way, to be capable of performing a separate-parameter adjustment for each of the member channels by use of the physical channel strips STP1 to STPk supports an environment where a user can easily handle operators for adjusting parameters. For example, even if the display panel 25 is of a small size, because the channel strips STP1 to STPk of a size larger than the display panel 25 can be used, an environment where a user can easily handle operators will be realized. In another example, in a case where the display panel 25 has only display function and has no touch detection function, because the "flip" operation realizes that the separate-parameter adjustment for each of the deployed member channels can be performed by use of the channel strip panel 24, the "flip" operation according the present embodiment brings an advantageous result. Note that it is possible for each of the respective values of the predetermined type of parameters of the respective channels stored in the current buffer (namely, original values) to reflect an amount of the separate-parameter adjustment performed by use of the channel strip panel 24. Namely, the original values stored in the current buffer may be renewed according to the separate-parameter adjustment.

Further, with the current parameter values (namely, the modified values) of the respective member channels of the DCA group having been deployed on the channel strip panel 24 according to the "flip" operation, once the "flip" switch is operated again, a "Yes" determination is made at step S12 of FIG. 9 by the CPU 21, and then the CPU 21 performs the processing at step S13. Thus, the setting contents of the channel strips STP1 to STPk and the parameter contents displayed on the display panel 25 can be interchanged again; namely, a group deployment condition can be returned to the display panel 25 so as to display on the display screen and the DCA group layer can be returned to the channel strip panel 24.

When the CPU 21 performs the "flip" process of FIG. 9, the CPU 21 functions as a flip processing circuitry that, in response to the flipping instruction, interchanges the values of the respective audio-signal-adjusting parameters of the one or more channels belonging to the group and the setting contents of the respective manual-operators (51) in the plurality of channel strips STP1 to STPk to be presented by use of respective ones of the display device 12 (namely, the display panel 25) and the plurality of channel strips STP1 to STPk.

Figure 10:
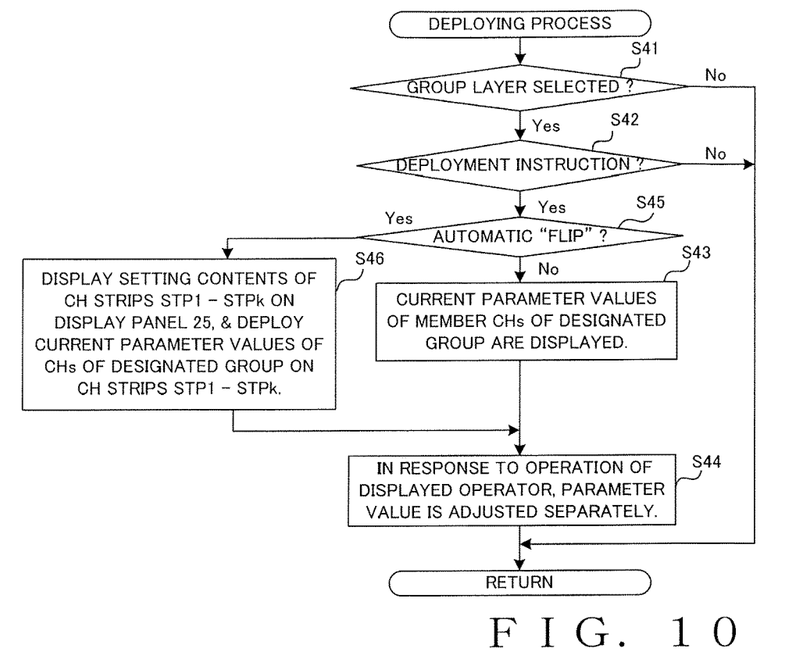
FIG. 10 is a schematic flow chart showing another example of the deploying process executed by the CPU shown in FIG. 2.

FIG. 10 is a schematic flow chart showing such a modification of the deploying process shown in FIG. 6 that the "flip" process is automatically performed in response to the deployment instruction. In FIG. 10, the steps to which the reference characters are allotted as same as FIG. 6 perform the same processing as FIG. 6, and an overlapping description about these steps will be omitted hereinafter. This automatic "flip" process performs processing corresponding to the second deployment mode such that the CPU 21 deploys at once, on the corresponding channel strips STP1 to STPk of the channel strip panel 24, the current parameter values (namely, the modified values) of the respective member channels of the DCA group as designated for the deployment, without displaying these current parameter values (namely, the modified values) on the display panel 25, and that the CPU 21 causes the display panel 25 to display the setting contents of the DCA layer having appeared immediately before in the channel strips STP1 to STPk, instead. The automatic "flip" process can be carried out in an automatic "flip" mode that is previously set by a user or at default setting.

In FIG. 10, step S45 is inserted between the steps S42 and S43. At step S45, the CPU 21 determined whether an operation mode is previously set to the automatic "flip" mode or not. If the operation mode is not set to the automatic "flip" mode, then the CPU 21 proceeds to step S43, where it performs the deploying process according to the first deployment mode as aforementioned, and the automatic "flip" process (namely, the second deployment mode) is not performed. If the operation mode is set to the automatic "flip" mode, then the CPU 21 proceeds to step S46, where it performs the deploying process according to the second deployment mode. At step S46, the CPU 21 causes the display panel 25 to display strip images, on the display screen, indicative of the setting contents of the respective channel strips STP1 to STPk of the strip panel 24, and sets, to the corresponding channel strips STP1 to STPk of the strip panel 24, the current parameter values (the modified values) of the respective member channels of the DCA group as designated for the deployment; namely, the current parameter values (the modified values) are deployed on the channel strips STP1 to STPk. In this case too, the physical manual-operators such as the fader operator 51 and switches in the channel strips STP1 to STPk are electrically controlled to automatically move so as to present respective operation positions, corresponding to the deployed current parameter values (namely, modified values), in the respective physical manual-operators. After step S46, the CPU 21 proceeds to step S44. Note that, in this modification too, the step S44 can be omitted as aforementioned. In a case where the automatic "flip" process is performed in the aforementioned manner too, the deployed current parameter values (namely, modified values) of the member channels of the DCA group can be modified or adjusted separately by an operation of any of the channel strips STP1 to STPk. Further, because the setting condition, immediately before the deployment instruction, of the respective strips of the DCA layer in the channel strip panel 24 are maintained with strip images displayed on the display panel 25, it is never caused such inconvenience that the setting contents of the channel strips STP1 to STPk having been used immediately before the deployment instruction are avoided by overwritten with contents of the deployment.

Further, with the current parameter values of the respective member channels of the DCA group having been deployed on the channel strip panel 24 according to the automatic "flip" process performed at step S46 of FIG. 10, once the "flip" switch is operated again, the CPU 21 performs the processing at step S13 of FIG. 9. Thus, the setting contents of the channel strips STP1 to STPk and the parameter contents displayed on the display panel 25 can be interchanged; namely, a group deployment condition can be displayed on the display screen of the display panel 25 and the DCA group layer can be returned to the channel strip panel 24.

Figure 11:
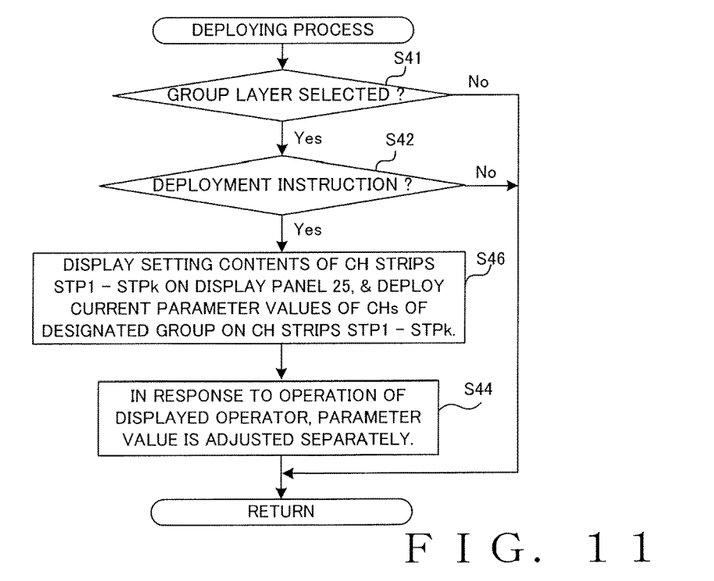
FIG. 11 is a schematic flow chart showing a further example of the deploying process executed by the CPU shown in FIG. 2.

The embodiment of FIG. 10 is configured to selectively carry out one of the first and second deployment modes depending on an ON or OFF state of the automatic "flip" process. However, the present invention is not limited to the embodiment of FIG. 10 and may be modified variously; for example, the CPU 21 may be configured to carry out only the automatic "flip" process, namely the second deployment modes. For this purpose, as shown in FIG. 11, the flow chart may be changed from FIG. 10 so as to omit the steps S45 and S43 as shown in FIG. 10 and insert the step S46 between a "Yes" output of step S42 and step S44.

The present invention is applicable to not only the DCA groups but also any other type of groups and/or a relationship between any other type of groups and a master thereof. For example, the present invention is applicable in connection with any type of groups having such a relationship that parameters of member channels of a group can be controlled by a master operator in an interlinked fashion, such as a relationship between a group master and member channels in a muting group, a relationship between a group master and member channels in a linked-channel group, a relationship between a bus master and a plurality of channels from which audio signals are input to a mixing bus, a relationship between a master and member channels in a surround-channel group, etc. For example, control in the muting group is performed such that respective ON/OFF states of muting of a plurality of channels belonging to the group are controlled or adjusted collectively; control in the linked-channel group is performed such that a predetermined type of parameters, except tone volume parameter, of a plurality of channels belonging to the group is controlled or adjusted collectively with each other; control in the relationship between the bus master and the plurality of channels is performed such that respective send levels of audio signals supplied from the respective channels to the mixing bus are controlled or adjusted collectively by the bus master; and control in the surround-channel group is performed such that respective tone-volume levels of a plurality of channels grouped for an surround effect such as a 5.1 channel surround are controlled or adjusted collectively.

Whereas, in the above-described embodiments, the display device 12 (display panel 25) is previously provided on the operation panel of the signal controlling apparatus 10 (mixer 20), the present invention is not limited to the above-described embodiments, so the display device 12 (display panel 25) may be provided on the side of an external device or apparatus capable of communicating with the signal controlling apparatus 10 (mixer 20). For example, a device, such as a display panel of a mobile phone terminal or the like, which is existent independently from the signal controlling apparatus 10 (mixer 20) may be employed as the display device 12 (display panel 25). In such a case, the signal controlling apparatus 10 (mixer 20) may communicate with the mobile phone terminal or the like as necessary so that various display screens related to the embodiments of the present invention may be generated on the display panel of the mobile phone terminal or the like 25).

In the above-described embodiments, the mixer 20 is not limited to a dedicated audio mixer, and may be constructed with a computer device, such as a personal computer, implemented by software programs for executing a mixing processing operation of audio signals.

Further, the signal controlling apparatus 10 of the present invention is applicable to any type of signal controlling apparatus or signal processing apparatus such as a recorder, amplifier, processor, etc. other than the mixer 20. In such a case, a kind of signals to be subjected to the signal processing performed in the plurality of channels is not limited to audio signals, and the plurality of channels provided in the signal controlling apparatus 10 may be constructed to perform suitable signal processing on any kind of signals, such as video signals and other kind of electric/electronic signals, or even optical signals. Furthermore, the signal controlling apparatus 10 may comprise a personal computer having executably installed therein a DAW (Digital Audio Workstation) software application executable on a multi-purpose personal computer. Further, the signal controlling apparatus 10 of the present invention may comprise a dedicated hardware apparatus (integrated circuitry etc.) constructed to perform the various functions described in the above embodiments.

Moreover, the present invention may be constructed and implemented as a method invention which is designed to deploy parameters in a signal controlling apparatus comprising a plurality of channels configured to perform signal processing on input signals and a plurality of channel strips each including a manual-operator for controlling a signal and which comprises: allocating a group of one or more channels among the plurality of channels to one of the plurality of channel strips, so that respective signal-adjusting parameters of the one or more channels belonging to the group are controlled in an interlinked fashion in response to an operation of the manual-operator included in the one channel strip to which the group is allocated; and in response to a deployment instruction, presenting values of the respective signal-adjusting parameters of the one or more channels belonging to the group in such a manner that the values of the respective signal-adjusting parameters of the one or more channels belonging to the group are presented by use of one of a display device and the plurality of channel strips, and that setting contents of the respective manual-operators in the plurality of channel strips are presented by use of another of the display device and the plurality of channel strips. Furthermore, the present invention may be constructed and implemented as a program invention which is designed to cause a computer to perform respective steps included in the method.

Whereas various embodiments of the present invention have been described above in detail, it should be appreciated that the present invention is not necessarily limited to the above-described embodiments and may be modified variously within the scope of the technical ideal disclosed in the claims, description and drawings.

This application is based on, and claims priority to, Japanese Patent Application No. 2017-037609 filed on 28 Feb. 2017. The disclosure of the priority application, in its entirety, including the drawings, claims, and the specification thereof, are incorporated herein by reference.

What is claimed is:

1. A signal controlling apparatus comprising:
   a plurality of channels that perform signal processing on input signals;
   a plurality of channel strips each including a manual-operator for controlling a signal;
   a storage medium storing a program; and
   a processor configured to implement the program to:
      allocate a group of one or more channels, among the plurality of channels, to one of the plurality of channel strips, so that respective signal-adjusting parameters of the one or more channels belonging to the group are controlled in an interlinked fashion in response to an operation of the manual-operator included in the one channel strip to which the group is allocated; and
      present, in response to a deployment instruction, values of the respective signal-adjusting parameters of the one or more channels belonging to the group using one of a display device or the plurality of channel strips, and setting contents of the respective manual-operators in the plurality of channel strips using the other of the display device or the plurality of channel strips.

2. The signal controlling apparatus as claimed in claim 1, wherein the input signals are audio signals, and the plurality of channels performs signal processing on the input audio signals.

3. The signal controlling apparatus as claimed in claim 1, wherein, in response to the deployment instruction, the processor controls the display device to display the values of the respective signal-adjusting parameters of the one or more channels belonging to the group, and controls the respective manual-operators in the plurality of channel strips to maintain the setting contents of the respective manual-operators as they are.

4. The signal controlling apparatus as claimed in claim 3, wherein the processor is further configured to adjust, separately from each other, the values of the respective signal-adjusting parameters displayed on the display device in response to a user's operation.

5. The signal controlling apparatus as claimed in claim 4, wherein:
   the display device has a touch-type display panel screen for detecting a user's touch operation, and
   the processor is configured to cause the display device to display virtual manual-operators on the touch-type display panel screen, the virtual manual-operators being used for adjusting the values of the respective signal-adjusting parameters displayed on the display device.

6. The signal controlling apparatus as claimed in claim 1, wherein:
   in response to the deployment instruction, the processor controls one or more of the plurality of channel strips to set the values of the respective signal-adjusting parameters of the one or more channels belonging to the group to one or more of the plurality of channel strips, and
   the setting contents of the respective manual-operators in the one or more channel strips at least are displayed on the display device.

7. The signal controlling apparatus as claimed in claim 6, wherein the values of the respective signal-adjusting parameters set to the one or more channel strips in response to the deployment instruction are adjustable separately by an operation of a corresponding one of the one or more channel strips.

8. The signal controlling apparatus as claimed in claim 1, wherein the processor is further configured to, in response to a flipping instruction, interchange the values of the respective signal-adjusting parameters of the one or more channels belonging to the group and the setting contents of the respective manual-operators in the plurality of channel strips to be presented using respective ones of the display device and the plurality of channel strips.

9. A method of deploying parameters in a signal controlling apparatus including a plurality of channels that perform signal processing on input signals, and a plurality of channel strips each including a manual-operator for controlling a signal, the method comprising the steps of:

allocating a group of one or more channels among the plurality of channels to one of the plurality of channel strips, so that respective signal-adjusting parameters of the one or more channels belonging to the group are controlled in an interlinked fashion in response to an operation of the manual-operator included in the one channel strip to which the group is allocated; and in response to a deployment instruction, presenting values of the respective signal-adjusting parameters of the one or more channels belonging to the group using one of a display device or the plurality of channel strips, and setting contents of the respective manual-operators in the plurality of channel strips using the other of the display device or the plurality of channel strips.

10. A non-transitory storage medium containing a group of instructions executable by a processor to perform a method of deploying parameters in a signal controlling apparatus including a plurality of channels that perform signal processing on input signals, and a plurality of channel strips each including a manual-operator for controlling a signal, the method comprising the steps of:

allocating a group of one or more channels among the plurality of channels to one of the plurality of channel strips, so that respective signal-adjusting parameters of the one or more channels belonging to the group are controlled in an interlinked fashion in response to an operation of the manual-operator included in the one channel strip to which the group is allocated; and in response to a deployment instruction, presenting values of the respective signal-adjusting parameters of the one or more channels belonging to the group using one of a display device or the plurality of channel strips, and setting contents of the respective manual-operators in the plurality of channel strips using the other of the display device or the plurality of channel strips.

* * * * *